United States Patent [19]

Ward

[11] Patent Number: 4,517,074

[45] Date of Patent: May 14, 1985

[54] HYDROCARBON CONVERSION PROCESS

[75] Inventor: John W. Ward, Yorba Linda, Calif.

[73] Assignee: Union Oil Company of California, Los Angeles, Calif.

[21] Appl. No.: 531,924

[22] Filed: Sep. 13, 1983

Related U.S. Application Data

[62] Division of Ser. No. 84,761, Oct. 15, 1979, Pat. No. 4,419,271.

[51] Int. Cl.$^3$ .............. C10G 45/12; C10G 47/18; C10G 47/20
[52] U.S. Cl. ............... 208/111; 208/254 H; 208/216 R
[58] Field of Search .......... 208/111, 120, 251 H, 208/254 H, 216 R

[56] References Cited

U.S. PATENT DOCUMENTS

| | | | |
|---|---|---|---|
| 3,312,615 | 4/1967 | Cramer et al. | 208/120 |
| 3,542,670 | 11/1970 | Erickson et al. | 208/120 |
| 3,617,483 | 11/1971 | Child et al. | 208/59 |
| 3,729,521 | 4/1973 | Gutberlet et al. | 585/475 |
| 3,781,199 | 12/1973 | Ward | 208/89 |
| 3,783,124 | 1/1974 | Rubin et al. | 208/111 |
| 3,835,027 | 9/1974 | Ward | 208/111 |
| 3,838,040 | 9/1974 | Ward | 208/111 |
| 3,853,742 | 12/1974 | Ward | 208/111 |
| 3,897,327 | 7/1975 | Ward | 208/111 |
| 3,909,450 | 9/1975 | O'Hara | 208/111 |
| 3,926,780 | 12/1975 | Ward | 208/111 |
| 3,929,672 | 12/1975 | Ward | 502/79 |
| 3,945,943 | 3/1976 | Ward | 502/79 |
| 3,997,618 | 12/1976 | Cornely et al. | 585/481 |
| 4,060,480 | 11/1977 | Reed et al. | 208/111 |
| 4,062,809 | 12/1977 | Ward | 502/219 |
| 4,085,068 | 4/1978 | Gallagher et al. | 502/255 |
| 4,097,365 | 7/1978 | Ward | 208/111 |
| 4,115,248 | 9/1978 | Mulaskey | 208/112 |
| 4,120,825 | 10/1978 | Ward | 502/64 |
| 4,121,996 | 10/1978 | Hilfman | 208/111 |
| 4,179,356 | 12/1979 | O'Hara et al. | 208/111 |
| 4,182,693 | 1/1980 | Gladrow | 208/120 |
| 4,193,454 | 3/1980 | Goldstein | 208/120 |
| 4,238,316 | 12/1980 | Mooi et al. | 208/58 |
| 4,309,277 | 1/1982 | O'Hara et al. | 208/111 |
| 4,326,947 | 4/1982 | Sawyer et al. | 208/111 |
| 4,376,039 | 3/1983 | Gladrow et al. | 208/120 |
| 4,400,571 | 8/1983 | Robinson | 208/111 |

FOREIGN PATENT DOCUMENTS 2906656 8/1979 Fed. Rep. of Germany.

Primary Examiner—Delbert E. Gantz
Assistant Examiner—O. Chaudhuri
Attorney, Agent, or Firm—Dean Sandford; Gregory F. Wirzbicki

[57] ABSTRACT

A hydrocarbon conversion catalyst useful for hydrocracking hydrocarbons to more valuable products comprises one or more hydrogenation components supported on a base containing (1) a crystalline aluminosilicate zeolite having activity for cracking hydrocarbons and (2) a dispersion of silica-alumina in an alumina matrix.

44 Claims, No Drawings

HYDROCARBON CONVERSION PROCESS

CROSS-REFERENCE TO RELATED APPLICATIONS

This application is a division of U.S. Ser. No. 84,761 filed Oct. 15, 1979, now U.S. Pat. No. 4,419,271.

BACKGROUND OF THE INVENTION

This invention relates to a hydrocracking process and a catalyst for use therein. More particularly, it relates to a hydrocracking catalyst of improved activity, selectivity, and stability for producing middle distillates from heavy gas oils and the like under hydrocracking conditions.

Petroleum refiners often produce desirable products such as turbine fuel, diesel fuel, and other middle distillate products by hydrocracking a heavy gas oil, i.e., a hydrocarbon fraction having a boiling point range between about 700° F. and 1050° F. Hydrocracking is accomplished by contacting the heavy gas oil at an elevated temperature and pressure in the presence of hydrogen and a suitable hydrocracking catalyst so as to yield a middle distillate fraction boiling in the 300° to 700° F. range and containing the desired turbine and diesel fuels.

The three main catalytic properties by which the performance of a hydrocracking catalyst for producing middle distillate products is evaluated are activity, selectivity, and stability. Activity may be determined by comparing the temperature at which various catalysts must be utilized under otherwise constant hydrocracking conditions with the same feedstock so as to produce a given percentage (usually 60%) of products boiling below 700° F. The lower the activity temperature for a given catalyst, the more active such a catalyst is in relation to a catalyst of higher activity temperature. Selectivity of hydrocracking catalysts may be determined during the foregoing described activity test and is measured as that percentage fraction of the 700° F.-minus product boiling in the range of middle distillate or midbarrel products, i.e., 300° to 700° F. Stability is a measure of how well a catalyst maintains its activity over an extended time period when treating a given hydrocarbon feedstock under the conditions of the activity test. Stability is generally measured in terms of the change in temperature required per day to maintain a 60% or other given conversion.

As could be expected, the aim of the art is to provide a catalyst having at once the highest possible activity, selectivity, and stability. Catalysts usually utilized for hydrocracking comprise a Group VIII metal component, most often cobalt or nickel sulfides, in combination with a Group VIB metal component, most often molybdenum or tungsten sulfides, supported on a refractory oxide. For given proportions of Group VIII and Group VIB metal components, the activity, selectivity, and stability of a catalyst change dramatically with different supports. Support materials comprising crystalline aluminosilicate zeolites, such as Zeolite Y in the hydrogen form, generally provide high activity but low selectivity, whereas support materials consisting essentially of refractory oxides, such as alumina, magnesia, and silica-alumina, generally have relatively poor activity but high selectivity.

The object of the present invention, therefore, is to provide a hydrocracking catalyst having superior overall catalytic properties for hydrocracking hydrocarbons. More specifically, it is an object of the invention to provide a catalyst having superior overall activity, selectivity, and stability for hydrocracking in comparison to prior art catalysts. It is a further object to provide a hydrocracking process for converting gas oils and the like to middle distillate products. It is a further object to provide a support or carrier material useful with a hydrogenation component as a catalyst for hydrogenating and/or hydrocracking hydrocarbons. These and other objects and advantages will become more apparent in light of the following description of the invention.

SUMMARY OF THE INVENTION

The present invention is an improvement of the catalyst described in U.S. Pat. No. 4,097,365, herein incorporated by reference. The catalyst described in this reference is a midbarrel hydrocracking catalyst comprising hydrogenation components on a refractory oxide support comprising silica-alumina dispersed in a matrix of alumina. The present invention improves this catalyst by including in the support a crystalline aluminosilicate zeolite having cracking activity, such as hydrogen Y zeolite or a rare earth-exchanged Y zeolite. In addition to having excellent activity for hydrodenitrogenation and hydrodesulfurization, the catalyst of the invention has been found to have superior overall properties of activity, selectivity, and stability for hydrocracking in comparison to the catalyst described in U.S. Pat. No. 4,097,365. In the usual instance, the catalyst of the invention is more active, more stable, and more selective than comparison catalysts having supports consisting essentially of either a dispersion of silica-alumina in an alumina matrix or a zeolite plus a refractory oxide other than a dispersion of silica-alumina in an alumina matrix.

In its broadest embodiment, the present invention provides a catalyst support comprising in intimate admixture (1) a crystalline aluminosilicate zeolite having cracking activity and (2) a dispersion of silica-alumina in an alumina matrix. Although the support is most preferred when used in conjunction with a hydrogenation component, it may itself be utilized in the absence of a hydrogenation component as a catalyst for converting hydrocarbons to more valuable products by acid catalyzed reactions, such as catalytic cracking, isomerization of n-paraffins to isoparaffins, isomerization of alkyl aromatics, alkylation, and transalkylation of alkyl aromatics.

DETAILED DESCRIPTION OF THE INVENTION

The catalyst of the invention is an intimate composite of one or more hydrogenation components, a crystalline aluminosilicate zeolite having catalytic activity for cracking hydrocarbons, and a dispersion of silica-alumina in a matrix consisting essentially of alumina. The hydrogenation components useful in the invention are the metals, oxides, and sulfides of uranium, the Group VIII elements, and the Group VIB elements. The most suitable hydrogenation components are selected from the group consisting of the metals, oxides, and sulfides of platinum, palladium, cobalt, nickel, tungsten, and molybdenum. The preferred catalyst contains at least one Group VIII metal component, and at least one Group VIB metal component, with the most preferred combination being a nickel and/or cobalt component with a molybdenum and/or tungsten component.

The hydrogenation component or components are intimately composited on a base or support comprising a mixture of one or more crystalline aluminosilicate zeolites having cracking activity and a heterogeneous dispersion of finely divided silica-alumina in a matrix of alumina. The suitable zeolites for use herein include crystalline aluminosilicate molecular sieves having catalytic activity for cracking hydrocarbons. Many naturally-occurring and synthetic crystalline aluminosilicate zeolites known in the art are useful in the invention, including, for example, faujasite, mordenite, erionite, Zeolite Y, Zeolite X, Zeolite L, Zeolite Omega, Zeolite ZSM-4, and their modifications. These and other such zeolitic molecular sieves are known to have activity for cracking hydrocarbons when a substantial proportion of the ion exchange sites are occupied with hydrogen ions or multivalent metal-containing cations, particularly rare earth cations. Normally, crystalline aluminosilicate zeolites are obtained in the alkali metal form and as such are largely inactive for catalytically cracking hydrocarbons. To produce a zeolite having cracking activity, the alkali metals are usually replaced with multivalent metal-containing cations, hydrogen ions, or hydrogen ion precursors (e.g. ammonium ion). This replacement of cations is generally accomplished by ion exchange, a method well-known in the art wherein the zeolite in the sodium or other alkali metal form is contacted with an aqueous solution containing hydrogen ions, ammonium ions, rare earth ions, or other suitable cations. Replacing even a portion of the sodium ions produces a zeolites having some cracking activity, but reducing the alkali metal content to less than 5 wt.%, preferably to less than 1 wt.%, and most preferably to less than about 0.5 wt.% (calculated as the alkali metal oxides), results in a material having substantial cracking activity, with the activity varying according to the zeolite and the amount of alkali metals removed.

In addition to the zeolites referred to above, many other crystalline aluminosilicate zeolites in their non-alkali metal forms may be utilized in the catalyst support of the invention. Preferred zeolites contain at least 50% of their pore volume in pores of diameter greater than 8 Angstroms, with Zeolite Y (and its modifications) in the hydrogen form or in other forms imparting cracking activity to the zeolite being preferred zeolites for use in the invention. Also preferred are zeolites that have been ion-exchanged with ammonium ions and then steam stabilized in accordance with the teachings of U.S. Pat. No. 3,929,672, herein incorporated by reference. The most highly preferred zeolite is a material known as LZ-10, a zeolitic molecular sieve available from Union Carbide, Linde Division. Although LZ-10 is a proprietary material, it is known that LZ-10 is a modified Y zeolite having a silica to alumina ratio between about 3.5 and 6.0, a surface area between about 500 and 700 $m^2/gm$, a unit cell size between about 24.25 and 24.35 Angstroms, water absorption capacity less than about 8% by weight of the zeolite (at 4.6 mm partial pressure of water vapor and 25° C.), and an ion-exchange capacity less than 20% of that of a sodium Y zeolite of comparable silica to alumina ratio. When used as a hydrocracking catalyst, LZ-10 is highly active and selective for midbarrel hydrocracking, especially when composited with alumina and suitable hydrogenation components.

The support material utilized in the invention usually comprises between 2 and about 80% by weight, preferably between about 10 and about 70% by weight, of a crystalline aluminosilicate zeolite such as LZ-10. The support also comprises a substantial proportion of a heterogeneous dispersion of finely divided silica-alumina in an alumina matrix. Usually, the dispersion comprises at least 15% by weight of the support, with the preferred and most preferred proportions being in the respective ranges of 30 to 98% and 30 to 90% by weight of the support.

One convenient method of preparing the catalyst support herein is to comull an alumina hydrogel with a silica-alumina cogel in hydrous or dry form. The cogel is preferably homogeneous and may be prepared in a manner such as that described in U.S. Pat. No. 3,210,294. Alternatively, the alumina hydrogel may be comulled with a "graft copolymer" of silica and alumina that has been prepared, for example, by first impregnating a silica hydrogel with an alumina salt and then precipitating alumina gel in the pores of the silica hydrogel by contact with ammonium hydroxide. In the usual case, the cogel or copolymer (either of which usually comprises silica in a proportion by dry weight of 20 to 96%, preferably 50 to 90%) is mulled with the alumina hydrogel such that the cogel or copolymer comprises 5 to 75% by weight, preferably 20 to 65% by weight, of the mixture. The overall silica content of the resulting dispersion on a dry basis is usually between 1 and 75 wt.%, preferably between 5 and 45 wt.%.

The mulled mixture of alumina gel with either a silicaalumina cogel or a silica and alumina "graft copolymer" may be utilized in the gel form or may be dried and/or calcined prior to combination with the zeolite. In the preferred method of preparation, the cogel or copolymer is spray dried and then crushed to a powdered form, following which the powder is mulled with a zeolite powder containing hydrogen ions, hydrogen ion precursors, or multivalent metal-containing cations, the amounts of cogel or copolymer mulled with said zeolite being such that the support will ultimately contain zeolite and dispersion in the proportions set forth hereinbefore. If desired, a binder may also be incorporated into the mulling mixture, as also may one or more active metal hydrogenation components in forms such as ammonium heptamolybdate, nickel nitrate or chloride, ammonium metatungstate, cobalt nitrate or chloride, etc. After mulling, the mixture is extruded through a die having suitable openings therein, such as circular openings of diameters between about 1/32 and ⅛ inch. Preferably, however, the die has openings therein in the shape of three-leaf clovers so as to produce an extrudate material similar to that shown in FIGS. 8 and 8A of U.S. Pat. No. 4,028,227. The extruded material is cut into lengths of about 1/32 to ¾ inch, preferably ¼ to ½ inch, dried, and calcined at an elevated temperature.

If desired, hydrogenation components may be composited with the support by impregnation; that is, rather than comulling the hydrogenation components with the support materials, the zeolite and dispersion are mulled, extruded, cut into appropriate lengths, and calcined. The resulting particles are then contacted with one or more solutions containing the desired hydrogenation components in dissolved form, and the composite particles thus prepared are dried and calcined to produce finished catalyst particles.

Usually, the finished catalyst contains at least about 0.5 wt.% of hydrogenation components, calculated as the metals. In the usual instance, wherein a Group VIII metal and a Group VIB metal component are utilized in combination, the finished catalyst contains between about 5% and 35%, preferably between about 10 and 30% by weight, calculated as the respective trioxides, of the Group VIB metal components and between about 2% and 15%, preferably between 3 and 10% by weight, calculated at the respective monoxides, of the Group VIII metal components.

If desired, a phosphorus component may also be incorporated in the catalyst by either comulling the support materials with phosphoric acid or including phosphoric acid in the impregnating solution. Usual and preferred proportions of phosphorus in the catalyst fall in the ranges of 1 to 10 wt.% and 3 to 8 wt.%, calculated as $P_2O_5$.

The hydrogenation components, which will largely be present in their oxide forms after calcination in air, may be converted to their sulfide forms, if desired, by contact at elevated temperatures with a reducing atmosphere comprising hydrogen sulfide. More conveniently, the catalyst is sulfided in situ, i.e., by contact with a sulfur-containing feedstock to be catalytically converted to more valuable hydrocarbons in such processes as hydrocracking, hydrotreating, etc.

The foregoing described catalysts are especially useful for hydrogenation reactions, such as hydrodenitrogenating and hydrodesulfurizing hydrocarbons, but are particularly useful with respect to hydrocracking to convert a hydrocarbon feedstock to a more valuable product of lower average boiling point and lower average molecular weight. The feedstocks that may be treated herein by hydrogenation include all mineral oils and synthetic oils (e.g., shale oil, tar sand products, etc.) and fractions thereof. Typical feedstocks include straight run gas oils, vacuum gas oils, deasphalted vacuum and atmospheric residua, coker distillates and cat-cracker distillates. Preferred hydrocracking feedstocks include gas oils and other hydrocarbon fractions having at least 50% by weight of their components boiling above 700° F. Suitable and preferred conditions for hydrocracking gas oil feedstocks, as well as for hydrodenitrogenating and/or hydrodesulfurizing such feedstocks, are:

TABLE I

|  | Suitable | Preferred |
|---|---|---|
| Temperature, °F. | 500–850 | 600–800 |
| Pressure, psig | 750–3500 | 1000–3000 |
| LHSV | 0.3–5.0 | 0.5–3.0 |
| H$_2$/Oil, MSCF/bbl | 1–10 | 2–8 |

As will be shown by the following Examples, which are provided for illustrative purposes and are not to be construed as limiting the scope of the invention as defined by the claims, the present catalysts have been found to possess superior overall catalytic properties with respect to activity, selectivity, and stability when conversion of gas oils to midbarrel products by hydrocracking is desired. In many instances, the catalysts of the invention have been found to be superior in each of the three main performance categories of activity, selectivity, and stability.

EXAMPLE I

An experiment was performed to compare the activity, selectivity, and stability of catalysts of the invention containing LZ-10 and a dispersion of silica alumina in a gamma alumina matrix versus catalysts having supports consisting essentially of LZ-10 and gamma alumina. Following are the preparation procedures used for Catalyst Nos. 1 through 4, with Catalyst Nos. 2 and 3 being representative of the invention and Catalyst Nos. 1 and 4 being the comparison catalysts.

Catalyst No. 1

A mixture of 10% by weight powdered LZ-10 that had been ion-exchanged with ammonium nitrate to reduce the sodium content to about 0.1% by weight sodium (as Na$_2$O) and 90% by weight gamma alumina was extruded through a die having openings therein in a three-leaf clover shape, each leaf being defined by about a 270° arc of a circle having a diameter between about 0.02 and 0.04 inches. The extruded material was cut into ¼–½ inch lengths and calcined at 900° F. in air to convert the LZ-10 material to the hydrogen form. The calcined particles (300 gm) were then impregnated with 330 ml of an aqueous solution containing 67 gm of nickel nitrate (Ni(NO$_3$)$_2$.6H$_2$O) and 108 gm of ammonium metatungstate (91% WO$_3$ by weight). After removing excess liquid, the catalyst was dried at 230° F. and calcined at 900° F. in flowing air. The final catalyst contained 4.4 wt.% nickel components (calculated as NiO) and 25.0 wt.% tungsten components (calculated as WO$_3$).

Catalyst No. 2

The procedure described for Catalyst No. 1 was repeated except that in place of alumina a dispersion of spray dried, powdered silica-alumina in alumina prepared in a manner similar to that of Example 3 of U.S. Pat. No. 4,097,365 was used. The dispersion was prepared by mixing 44 parts by dry weight of a 75/25 silica-alumina graft copolymer and 56 parts by weight of hydrous alumina gel. In the final catalyst, the support consisted essentially of 10% LZ-10 in the hydrogen form and 90% dispersion of silica alumina in an alumina matrix, the dispersion consisting overall of 33% by weight silica and 67% by weight alumina. The resulting catalyst contained 4.1% by weight nickel components (as NiO) and 24.2% by weight tungsten components (as WO$_3$).

Catalyst No. 3

This catalyst was prepared in the same manner as Catalyst No. 2 except that the proportions of LZ-10 and dispersion admixed to prepare the support were adjusted so that in the final catalyst the proportion of LZ-10 in the support was 5% by weight and that of the dispersion, 95% by weight. The final catalyst contained 4.1% by weight nickel components (as NiO) and 23.6% by weight tungsten components (as WO$_3$) on a support of 5% LZ-10 and 95% dispersion.

Catalyst No. 4

This catalyst was prepared in the same manner as Catalyst No. 1 except that the proportions of LZ-10 and alumina admixed during preparation were such that in the final catalyst the proportion of LZ-10 in the support was 20% by weight and that of the gamma alumina, 80% by weight. The final catalyst contained 4.1% by weight nickel components (as NiO) and 24.4% by weight tungsten components (as WO$_3$) on a support of 20% LZ-10 and 80% gamma alumina.

Each of the foregoing catalysts was then activity tested according to the following method. A preheated light Arabian vacuum gas oil having the chemical and physical properties shown in Table II was passed on a once-through basis through an isothermal reactor containing 140 ml of catalyst particles uniformly mixed with 160 ml of 10 to 20 mesh quartz. Operating conditions were as follows: 1.0 LHSV, 2000 psig, a once-through hydrogen flow of 10,000 scf/bbl, and a run length of approximately 10 days. The temperature of the reactor was adjusted to provide a 60 volume percent conversion to products boiling at 700° F. or less. The results of the activity testing are reported in Table III.

TABLE II
PROPERTIES OF LIGHT ARABIAN VACUUM GAS OIL

| Gravity, °API | 22.3 | Pour Point, °F. | 100.0 |
|---|---|---|---|
| Distillation, °F., D-1160 | | Sulfur, XRF, wt. % | 2.37 |
| | | Nitrogen, KJEL, wt. % | 0.079 |
| IBP/5 | 693/760 | Hydrogen, wt. % | 12.20 |
| 10/20 | 777/799 | Chlorine, ppm | <1.0 |
| 30/40 | 815/832 | Carbon Residue D-189, wt. % | 0.14 |
| 50/60 | 850/870 | | |
| 70/80 | 894/920 | Viscosity, SSU at 100° F. | 319.0 |
| 90/95 | 958/979 | Viscosity, SSU at 210° F. | 51.1 |
| EP/% Rec. | 1053/99.0 | Specific Gravity | 0.9200 |

TABLE III

| No. | Catalyst Description of Support | Activity[1] Reactor Temp. to Provide 60% Conv. | Selectivity[2] Vol. % Conv. to 300°-700° F. Product | Stability[3] °F./day |
|---|---|---|---|---|
| 1 | 10% LZ-10 and 90% Gamma Alumina | 772° F. | 83.5 | 0.68 |
| 2 | 10% LZ-10 and 90% SiO$_2$—Al$_2$O$_3$ in Gamma Alumina Matrix | 750° F. | 83.5 | −0.72 |
| 3 | 5% LZ-10 and 95% SiO$_2$—Al$_2$O$_3$ in Gamma Alumina Matrix | 776° F. | 87.4 | 0.09 |
| 4 | 20% LZ-10 and 80% Gamma Alumina | 750° F. | 75.2 | 0.39 |

[1] Activity data are those obtained on tenth day of run.
[2] Selectivity data are an average of data obtained over 10 days and are calculated as the volume of 300°-700° F. components to the total volume of components boiling at or below 700° F.
[3] Stability data were calculated using the reactor temperature required to produce a 60% conversion on the 2nd and 10th days of the run.

The data in Table III reveal that in comparison to the two hydrocracking catalysts having supports consisting of LZ-10 and gamma alumina, the catalysts of the invention are far superior in terms of overall activity, selectivity, and stability. A comparison of Catalyst Nos. 1 and 2 shows that, for the same percentage of LZ-10 in the support, Catalyst No. 2 prepared in accordance with the invention was 22° F. more active and much more stable than Catalyst No. 1. In addition, Catalyst No. 2 proved to be as selective for producing midbarrel products as Catalyst No. 1. Comparing Catalysts Nos. 2 and 4 and Catalysts 3 and 1 shows that the catalysts of the invention are as active, but substantially more stable and selective, than their LZ-10-alumina comparisons containing twice as much zeolite.

EXAMPLE II

A second experiment was performed under the run conditions of Example I to demonstrate the improved performance attainable with the catalysts of the invention in comparison to the catalysts described in U.S. Pat. No. 4,097,365. The catalysts utilized in the experiment were prepared as follows:

Catalyst No. 5

A catalyst support was prepared in the same manner as described in Example 3 of U.S. Pat. No. 4,097,365 except that 54 parts of the silica-alumina graft copolymer were mixed with 46 parts of the hydrous alumina gel. The support (in the size and shape as Catalyst No. 1) was calcined and impregnated with a nickel nitrate-ammonium metatungstate solution as in the preparation of Catalyst No. 1, and then dried and calcined in the same way. The final catalyst contained 4.1 wt.% nickel components (as NiO) and 24.4 wt.% tungsten components (as WO$_3$) supported on a base consisting essentially of a dispersion of 75/25 silica-alumina in an alumina matrix, the base having an overall silica content of 40% and an overall alumina content of 60%.

Catalyst No. 6

This catalyst was prepared in the same manner as Catalyst No. 5 except that LZ-10 in the ammonium form and peptized alumina binder were incorporated into the support such that, after calcination, LZ-10 in the hydrogen form comprised 10 percent by weight of the support and the binder comprised 20 percent by weight of the support.

The results obtained from testing Catalysts Nos. 5 and 6 for activity, selectivity, and stability are reported in Table IV.

TABLE IV

| No. | Catalyst Description of Support | Activity[1] Reactor Temp. to Provide 60% Conv. | Selectivity[2] Vol. % Conv. to 300°-700° F. Product | Stability[3] °F./day |
|---|---|---|---|---|
| 5 | Dispersion of SiO$_2$/Al$_2$O$_3$ in Gamma Alumina Matrix | 773° F. | 88.7 | 0.23 |
| 6 | 10% LZ-10 and 90% Dispersion of SiO$_2$—Al$_2$O$_3$ | 753° F. | 87.4 | 0.05 |

TABLE IV-continued

| No. | Catalyst Description of Support | Activity[1] Reactor Temp. to Provide 60% Conv. | Selectivity[2] Vol. % Conv. to 300°–700° F. Product | Stability[3] °F./day |
|---|---|---|---|---|
| | Gamma Alumina | | | |

[1]Activity data are those obtained on tenth day of run.
[2]Selectivity data are an average of data obtained over 10 days and are calculated as the volume of 300°–700° F. components to the total volume of components boiling at or below 700° F.
[3]Stability data were calculated using the reactor temperatures required to produce a 60% conversion on the 2nd and 10th days of the run.

As is self-evident from the data in Table IV, the catalyst of the invention, Catalyst No. 6, proved far superior to a catalyst similar to that described in Example 3 of U.S. Pat. No. 4,097,365. Catalyst No. 6 provides substantially more activity and stability than Catalyst No. 5 with no significant loss in selectivity.

EXAMPLE III

A third comparison experiment was run to determine the activity of two catalysts of the invention comprising nickel and molybdenum components on supports comprising LZ-10 and a dispersion of silica-alumina in a gamma alumina matrix versus a catalyst comprising nickel and molybdenum components on a support comprising LZ-10 and alumina but containing no dispersion. The catalysts were prepared as follows:

Catalyst No. 7

Sixth grams of gamma alumina powder were co-mulled with 120 gm LZ-10 in the ammonia form, 20 gm peptized alumina, 75 gm ammonium heptamolybdate ($(NH_4)_6Mo_7O_{24}\cdot4H_2O$), and 85 gm nickel nitrate hexahydrate. The mulled mixture was extruded through a die similar to that used in preparing Catalyst No. 1, cut into ¼–½ inch lengths, and calcined in air at 900° F. The resulting catalyst contained 7.7 wt.% nickel components (as NiO), 21.9 wt.% molybdenum components (as $MoO_3$), about 43 wt.% LZ-10, about 21 wt.% gamma alumina, and the remainder (about 7 wt.%) peptized alumina.

Catalyst No. 8

This catalyst was prepared in the same fashion as was Catalyst No. 7 except that, in place of the gamma alumina, 60 gm of a powdered dispersion of 75/25 silica-alumina in a gamma alumina matrix was used. The dispersion was prepared by spray drying a mixture comprising 33 parts by weight silica-alumina graft copolymer with 67 parts by weight of hydrous alumina gel. The final catalyst contained 7.4 wt.% nickel components (as NiO), 21.5 wt.% molybdenum components (as $MoO_3$), about 43 wt.% LZ-10, about 7% of peptized alumina, and about 21% of the dispersion containing 25 wt.% silica and 75 wt.% alumina overall.

Catalyst No. 9

This catalyst was prepared in the same manner as Catalyst No. 8 except that the dispersion was prepared by mixing 54 parts by weight of 75/25 silica-alumina graft copolymer with 46 parts by weight of hydrous alumina gel. The final catalyst was of the same composition as Catalyst No. 8 except for the overall silica and alumina contents of the dispersion, which were 40% and 60% by weight, respectively.

The foregoing catalysts were subjected to the 10-day activity tests described in Example I, and the results are shown in Table V. As shown, the results prove the superiority of the catalysts of the invention (i.e., Catalysts Nos. 8 and 9) in all categories. In addition, the data show the improvement obtained when the silica contents of the catalysts of the invention are increased.

TABLE V

| No. | Catalyst Description of Support | Activity[1] Reactor Temp. To Provide 60% Conv. | Selectivity[2] Vol. % Conv. to 300°–700° F. Product | Stability[3] °F./day |
|---|---|---|---|---|
| 7 | LZ-10 and Gamma Alumina | 745° F. | 74.8 | 1.43 |
| 8 | LZ-10 and $SiO_2$—$Al_2O_3$ in Gamma Alumina Matrix (25% $SiO_2$ Overall) | 743° F. | 79.4 | 0.17 |
| 9 | LZ-10 and $SiO_2$—$Al_2O_3$ in Gamma Alumina Matrix (40% $SiO_2$ Overall) | 733° F. | 79.5 | 0.88 |

[1]Activity data are those obtained on tenth day of run.
[2]Selectivity data are an average of data obtaind over 10 days and are calculated as the volume of 300°–700° F. components to the total volume of components boiling at or below 700° F.
[3]Stability data were calculated using the reactor temperatures required to produce a 60% conversion on the 2nd and 10th days of the run.

EXAMPLE IV

A fourth experiment was conducted to compare the catalytic properties of a catalyst of the invention incorporating a stabilized Y zeolite with the catalytic properties of a similar catalyst containing stabilized Y zeolite but containing no dispersion of silica-alumina in an alumina matrix. The two catalysts were prepared as follows:

Catalyst No. 10

A mixture of 40 gm stabilized Y zeolite (prepared in accordance with the method described in U.S. Pat. No. 3,929,672 for Catalyst A in Example 16 but without adding palladium), 40 gm peptized alumina binder, and 120 gm of dispersion of the kind described for Catalyst No. 9 were comulled with a 380 ml aqueous solution containing 78 gm ammonium heptamolybdate tetrahydrate, 29.1 gm phosphoric acid (85% $H_3PO_4$), and 85 gm nickel nitrate hexahydrate. The resulting material was extruded in the same manner as Catalyst No. 1, cut into particles of ¼–½ inch length, and calcined in air at 900° F. The final catalyst contained about 6 wt.% nickel components (as NiO), about 19 wt.% molybdenum components (as MoO$_3$), and about 6 wt.% phosphorus components (as P$_2$O$_5$).

Catalyst No. 11

This catalyst was prepared in a manner similar to that of Catalyst No. 10 with the major difference being (1) that the comulled mixture was extruded through a die having circular openings therein of about 1/16 inch diameter and (2) the comulled mixture contained 120 gm of powdered gamma alumina instead of the dispersion. The resulting catalyst had the same percentage composition of nickel, molybdenum, and phosphorus components as Catalyst No. 10.

The foregoing catalysts were then tested in a manner similar to that described in Example I except that Catalyst No. 1 was run for 13.6 days and Catalyst No. 11 for 8 days. The data obtained are presented in Table VI.

TABLE VI

| Catalyst No. | Description of Support | Activity[1] Reactor Temp. To Provide 60% Conv. | Selectivity[2] Vol. % Conv. To 300°–700° F. Product | Stability[3] °F./Day |
|---|---|---|---|---|
| 10 | Stabilized Y plus SiO$_2$—Al$_2$O$_3$ in Gamma Alumina Matrix | 733° F. | 70.0 | 1.1 (days 3.2 to 10) 0 (days 10.9 to 13.6) |
| 11 | Stabilized Y plus Gamma Alumina | 739° F. | 73.0 | 0.58 (days 2.8 to 8.1) |

[1]Activity as reported for Catalyst No. 10 is a corrected value obtained from data determined for the 10th day of the run, and the activity data reported for Catalyst No. 11 is extrapolated from data derived on the eighth day of the run.
[2]Selectivity data are the average of data obtained during first 10 days with Catalyst No. 10 and the 8 days of run with Catalyst No. 11.
[3]Stability data were calculated using the reactor temperatures required to produce a 60% conversion on the days specified in the Table.

The results in Table VI again show the overall superiority of the catalyst of the invention (Catalyst No. 10) with respect to activity, selectivity, and stability. The 6° F. differential in activity between the catalyst of the invention and the comparison catalyst represents about a 20% improvement in activity. Especially significant is the fact that after 10.9 days, Catalyst No. 10 showed no signs of deactivation, and thus the high activity indicated by the 733° F. result could be expected to be maintained.

EXAMPLE V

Catalyst No. 12 was prepared in the same manner as Catalyst No. 9 except that LZ-20 rather LZ-10 was utilized. (LZ-20 is a crystalline aluminosilicate zeolite, available from Union Carbide, Linde Division, having a unit cell size, a water sorption capacity, a surface area, and an ion exchange capacity somewhat higher than that of LZ-10.) The catalyst was tested in the same manner as described in Example I except that the run length was 8.5 days rather than 10 days. The results of the experiment were as follows: Activity: 733° F. (the operating temperature on the last day of run), Selectivity: 67.0% (as the average percentage conversion to middle distillates during the run), and Stability: 1.94° F./day as calculated between 2.1 days and the end of run and 1.86° F./day between 5.3 days and end of the run. A comparison of these data with those of Catalyst No. 9 in Example III indicate that better results are obtained with LZ-10 in the catalyst support of the invention than with LZ-20.

EXAMPLE VI

Catalyst No. 13 was prepared by mulling a mixture consisting essentially of 140 gm of a dispersion of silica-alumina in an alumina matrix as was used to prepare Catalyst No. 5, 20 gm LZ-10 in ammonia form (i.e., as in Example I), and 40 gm peptized alumina with 380 ml of an aqueous solution containing 78 gm ammonium heptamolybdate tetrahydrate, 29.1 gm phosphoric acid (85% H$_3$PO$_4$), and 85 gm nickel nitrate hexahydrate. The mulled mixture was wet sufficiently to form a paste and extruded through a die similar to that described in Example I. The extrudate was cut into ¼–½ inch particles in length, dried, and calcined at 900° F. The finished catalyst contained 7.6 wt.% nickel components (as NiO), 21.2 wt.% molybdenum components (as MoO$_3$), and 7.1 wt.% phosphorus components (as P$_2$O$_5$).

The foregoing catalyst was tested for its catalytic properties in the same manner as described in Example I, and the results were as follows: Activity: 750° F. on the tenth day of run, Selectivity: 85.6 as the average over the ten days of operation, and Stability: 0.85° F./day from days 2 through 10 and 0.11° F./day from days 5.8 through 10. These results indicate the high activity, selectivity, and stability of this embodiment of the catalyst of the invention.

EXAMPLE VII

During the runs performed on Catalyst No. 6 in Example II and Catalyst No. 10 in Example IV, samples of the product oils were obtained and analyzed for sulfur content by X-ray fluorescence analysis and nitrogen content by coulometric analysis. As shown by the data in Table II, the sulfur and nitrogen contents of the feedstock were 2.37 wt.% and 0.079 wt.%, respectively. In Table VII are reported the results of the analyses performed on the samples of product oil obtained in the experiments described in Examples II and IV. The data in Table VII indicate that Catalysts Nos. 6 and 10 had substantial activity for hydrodenitrogenation and hydrodesulfurization.

TABLE VII

| Catalyst | Temp. °F. | Days into Run When Sample Taken | Sulfur in Product, ppmw | Nitrogen in Product, ppmw |
|---|---|---|---|---|
| No. 6 | 750 | 10 | 6 | — |
| No. 10 | 730 | 10 | 93 | 2.2 |
| No. 10 | 734 | 13 | 62 | 1.3 |

EXAMPLE VIII

Zeolite LZ-10 is believed to be prepared by high temperature, steam calcining the hydrothermally stable and ammonia-stable Zeolite Y compositions described in U.S. Pat. No. 3,929,672, herein incorporated by reference. One specific method by which LZ-10 may be prepared is as follows:

A sample of air-dried ammonium exchanged Zeolite Y having a composition exclusive of water of hydration:

0.156 Na$_2$O:0.849(NH$_4$)$_2$O:Al$_2$O$_3$:5.13 SiO$_2$ is tableted into ⅛ inch diameter slugs and charged to a Vycor tube provided with external heating means and having a 24 inch length and a 2.5 inch diameter. The temperature of the charge is first raised to 600° C. in about 0.25 hours and then held at this temperature for one hour. During this 1.25 hour period, a pure steam atmosphere at 14.7 psia generated from demineralized water is passed upwardly through the charge at a rate of 0.1 to 0.5 lbs/hr. Ammonia gas generated during the heating deammoniation of the zeolite is passed from the system continuously. At the termination of the heating period, the steam flow is stopped and the temperature of the charge is lowered to ambient room temperature over a period of five minutes. The charge is removed from the Vycor tube, and the sodium cation content of the steamed material is reduced to about 0.25 weight percent (as $Na_2O$) by ion exchange using an aqueous solution of 30 weight percent ammonium chloride at reflux.

The low sodium material thus prepared is recharged to the Vycor tube and again steamed, this time using pure steam at 14.7 psia and a temperature of 800° C. for 4 hours. The product is then cooled to ambient temperature and has the following typical characteristics: Surface Area = 530 $m^2$/gm, Adsorptive Capacity of water at 4.6 mm partial pressure and 25° C. = 4.6 weight percent, and an ion exchange capacity equal to 4% of that of a sodium Y zeolite having a comparable $SiO_2:Al_2O_3$ ratio. (The comparable sodium Y zeolite to which LZ-10 zeolite is compared in the specification and claims herein is a sodium Y zeolite having essentially the same silica to alumina ratio as LZ-10 and having a sodium to aluminum content such that the ratio of $Na_2O:Al_2O_3$ is equal to 1.0).

Although the invention has been described in conjunction with several comparative examples, many variations, modifications, and alternatives of the invention as described will be apparent to those skilled in the art. Accordingly, it is intended to embrace within the invention all such variations, modifications, and alternatives as fall within the spirit and scope of the appended claims.

I claim:

1. In a process for hydrocracking a hydrocarbon liquid containing a substantial proportion of components boiling above about 700° F. to produce middle distillate products boiling between about 300° and 700° F. by contacting said hydrocarbon liquid at a temperature above about 700° F. with a hydrocracking catalyst at an elevated temperature and pressure and in the presence of added hydrogen, the improvement wherein said hydrocracking catalyst comprises in intimate admixture at least one Group VIB metal component and at least one Group VIII metal component, a crystalline aluminosilicate zeolite containing less than about 5% by weight of alkali metal components, calculated as the oxides thereof, and a dispersion of silica-alumina in a matrix consisting essentially of alumina.

2. In a process for hydrocracking hydrocarbons boiling above about 700° F. to produce middle distillate products boiling between about 300° F. and 700° F. by contacting said hydrocarbons boiling above about 700° F. with a hydrocracking catalyst at an elevated temperature and pressure and in the presence of added hydrogen, the improvement wherein said hydrocracking catalyst comprises at least one Group VIB metal component and at least one Group VIII metal component on a support comprising an intimate admixture of (1) a crystalline aluminosilicate zeolite having cracking activity and (2) silica-alumina dispersed in a matrix consisting essentially of alumina.

3. A process as defined in claim 1 wherein said Group VIB metal component is selected from the group consisting of the oxides and sulfides of molybdenum and tungsten and said Group VIII metal component is selected from the group consisting of the oxides and sulfides of nickel and cobalt.

4. A process as defined in claim 3 wherein said zeolite is selected from the group consisting of Zeolite X, Zeolite Y, Zeolite L, and Zeolite Omega, said zeolite containing less than about 1% by weight alkali metal components, calculated as the oxides thereof.

5. A process as defined in claim 3 wherein said zeolite is a modified Y zeolite having a $SiO_2:Al_2O_3$ ratio between about 3.5 and 6, a surface area between about 500 and 700 $m^2$/gm, a unit cell size between about 24.25 and 24.35 Å, an alkali metal content less than about 0.5 percent by weight, calculated as the oxides, and a water absorption capacity, at 4.6 mm water vapor partial pressure and 25° C., less than 8 percent by weight of the zeolite.

6. A process as defined in claim 3 or 5 wherein said silica-alumina dispersed in said alumina contains between about 50 and 90% by weight silica, and the dispersion of silica-alumina in said alumina matrix comprises between 20 and 65% by weight silica-alumina.

7. In a process for hydrocracking hydrocarbons to more valuable products of lower average molecular weight and lower average boiling point, the improvement comprising contacting a hydrocarbon feedstock at an elevated temperature and pressure in the presence of hydrogen with a catalyst comprising in intimate admixture at least one hydrogenation component, a crystalline aluminosilicate zeolite having cracking activity, and a dispersion of silica-alumina in a matrix consisting essentially of alumina.

8. A process as defined in claim 7 wherein said hydrogenation component is one or more components selected from the group consisting of platinum, palladium, cobalt, nickel, tungsten, molybdenum, their oxides, and their sulfides.

9. A process for removing one or more components selected from the group consisting of organonitrogen and organosulfur compounds from a hydrocarbon feedstock comprising contacting said hydrocarbon feedstock in the presence of hydrogen and under conditions of elevated temperature and pressure with a catalyst composition comprising in intimate admixture at least one hydrogenation component, a crystalline aluminosilicate zeolite having cracking activity, and a dispersion of silica-alumina in a matrix consisting of alumina.

10. A process as defined in claim 9 wherein said hydrogenation component is one or more components selected from the group consisting of cobalt, nickel, tungsten, molybdenum, uranium, their oxides, and their sulfides.

11. In a catalytic hydrocracking process, the improvement comprising contacting a hydrocarbon feedstock at an elevated temperature and pressure in the presence of hydrogen with a catalyst comprising at least one hydrogenation component selected from the group consisting of Group VIII and Group VIB metals, their oxides, and sulfides on a support comprising an intimate admixture of (1) a crystalline aluminosilicate zeolite having catalytic activity for cracking hydrocarbons and (2) silica-alumina dispersed in a matrix consisting essentially of alumina.

12. A process as defined in claim 11 wherein said zeolite is Zeolite Y ion-exchanged to contain less than about 0.5 percent by weight alkali metal components, calculated as the oxides thereof, said Zeolite Y containing cations selected from the group consisting of hydrogen ions and rare earth cations.

13. A process as defined in claim 11 wherein said hydrogenation component comprises both a Group VIB metal component and a Group VIII metal component.

14. A process as defined in claim 13 wherein said Group VIII metal component comprises nickel and said Group VIB metal comprises tungsten.

15. A process as defined in claim 7, 8, 11, 13, or 14 wherein said zeolite is a modified hydrogen Y zeolite having a unit cell size between about 24.25 and 24.35 angstroms and a water absorption capacity at 4.6 mm water vapor partial pressure and 25° C., less than 8 percent by weight of the zeolite.

16. A process as defined in claim 15 wherein said zeolite contains less than about 0.5 percent by weight alkali metal components, calculated as the oxides thereof.

17. A process as defined in claim 7, 8, 11, or 14 wherein said zeolite is a form of Zeolite Y.

18. In a catalytic hydrocracking process, the improvement comprising contacting a hydrocarbon feedstock at an elevated temperature and pressure in the presence of hydrogen with a catalyst comprising an intimate admixture of at least one hydrogenation component, a crystalline aluminosilicate zeolite containing less than about 0.5 weight percent alkali metal components, calculated as the oxides thereof, and a dispersion of silica-alumina in a matrix consisting essentially of alumina.

19. A process as defined in claim 7, 8, 13, or 18 wherein said silica-alumina dispersed in said alumina matrix contains between about 50 and 90 percent by weight silica, and the dispersion of silica-alumina in said alumina matrix comprises between about 20 and 65 percent by weight silica-alumina.

20. A process as defined in claim 15 wherein said silica-alumina dispersed in said alumina matrix contains between about 50 and 90 percent by weight silica, and the dispersion of silica-alumina in said alumina matrix comprises between about 20 and 65 percent by weight silica-alumina.

21. In a catalytic hydrocracking process, the improvement comprising contacting a hydrocarbon feedstock at an elevated temperature and pressure in the presence of hydrogen with a catalyst comprising a Group VIB or Group VIII hydrogenation component intimately composited with a zeolite-containing support, said support having been prepared by a method comprising the steps of:
(1) calcining an ammonium-exchanged zeolite Y containing between about 0.6 and 5 weight percent sodium, calculated as $Na_2O$, at a temperature between about 600° and 1650° F. in contact with water vapor for a sufficient time to substantially reduce the unit cell size of said zeolite and bring it to a value between about 24.40 and 24.64 angstroms;
(2) subjecting the calcined zeolite to further ammonium ion exchange under conditions such that the sodium content of the zeolite is reduced below about 0.6 weight percent, calculated as $Na_2O$;
(3) calcining the zeolite obtained from step (2) in contact with sufficient water vapor and for a sufficient time such that the unit cell size of the zeolite is reduced to between about 24.25 and 24.35 angstroms and the water absorption capacity of the zeolite at 4.6 mm water vapor partial pressure and 25° C. is less than 8 percent by weight of the zeolite; and
(4) intimately admixing the zeolite obtained from step (3) with a dispersion of silica-alumina in a gamma alumina matrix, and calcining the resulting admixture.

22. A process as defined in claim 21 wherein said catalyst comprises both a Group VIB and a Group VIII hydrogenation component.

23. A process as defined in claim 22 wherein said zeolite at the end of step (2) contains about 0.25 weight percent sodium, calculated as $Na_2O$, and at the end of step (3) has a water absorption capacity at 4.6 mm water vapor partial pressure and 25° C. of about 4.6 percent by weight of the zeolite.

24. A process as defined in claim 23 wherein said dispersion consists essentially of silica-alumina containing between about 50 and 90 percent by weight silica dispersed in gamma alumina, the overall silica content of the dispersion being between about 20 and 65 percent by weight silica-alumina.

25. A process as defined in claim 22 wherein said dispersion consists essentially of silica-alumina containing between about 50 and 90 percent by weight silica dispersed in gamma alumina, the overall silica content of the dispersion being between about 20 and 65 percent by weight silica-alumina.

26. A process as defined in claim 25 wherein the intimate admixture of zeolite and dispersion comprises between 10 and 70 percent by weight zeolite.

27. A process as defined in claim 26 wherein said catalyst comprises a Group VIII metal component selected from the group consisting of the oxides and sulfides of nickel and cobalt and one or more Group VIB metal components selected from the group consisting of the oxides and sulfides of molybdenum and tungsten.

28. In a catalytic hydrocracking process, the improvement comprising contacting a hydrocarbon feedstock at an elevated temperature and pressure in the presence of hydrogen with a catalyst comprising a hydrogenation component on a support comprising a crystalline aluminosilicate zeolite and a dispersion of silica-alumina in alumina, said zeolite having been prepared by a method comprising:
(1) calcining an ammonium-sodium Y zeolite containing about 0.6 to 5 weight percent of sodium as $Na_2O$, said calcining being carried out at a temperature between about 600° and 1650° F. in contact with at least about 0.2 p.s.i. of water vapor for a sufficient time to substantially reduce the unit cell size of said zeolite and bring it to a value between about 24.40 and 24.64 angstroms; and
(2) subjecting the calcined zeolite to further ammonium ion exchange under conditions adjusted to produce a product containing less than about 1 weight percent $Na_2O$.

29. A process as defined in claim 28 wherein in step (2) at least about 25 percent of the residual zeolitic sodium ions are exchanged with ammonium ions.

30. A process as defined in claim 28 or 29 wherein the conditions in step (2) are adjusted to produce a product containing less than about 0.6 weight percent $Na_2O$.

31. A process as defined in claim 28 or 29 wherein, subsequent to step (2), the product is subjected to a calcination in the presence of water vapor.

32. A process as defined in claim 30 wherein, subsequent to step (2), the product is subjected to a calcination in the presence of an atmosphere consisting essentially of steam.

33. A process as defined in claim 31 wherein said catalyst comprises both a Group VIB and a Group VIII hydrogenation component.

34. A process as defined in claim 33 wherein said dispersion consists essentially of silica-alumina containing between about 50 and 90 percent by weight silica dispersed in gamma alumina, the overall silica content of the dispersion being between about 20 and 65 percent by weight silica-alumina.

35. A process as defined in claim 34 wherein the support comprises between 10 and 70 percent by weight zeolite.

36. A process as defined in claim 35 wherein said catalyst comprises a Group VIII metal component selected from the group consisting of the oxides and sulfides of nickel and cobalt and one or more Group VIB metal components selected from the group consisting of the oxides and sulfides of molybdenum and tungsten.

37. A process as defined in claim 7, 8, 11, 18, 21, 22, 25, 27, or 28 wherein said feedstock is a gas oil having at least 50 percent by weight of its components boiling above 700° F. and said contacting results in the production of a substantial proportion of a hydrocarbon product boiling in the range of 300° to 700° F.

38. A process as defined in claim 16 wherein said feedstock is a gas oil having at least 50 percent by weight of its components boiling above 700° F. and said contacting results in the production of a substantial proportion of a hydrocarbon product boiling in the range of 300° to 700° F.

39. A process as defined in claim 33 wherein said feedstock is a gas oil having at least 50 percent by weight of its components boiling above 700° F. and said contacting results in the production of a substantial proportion of a hydrocarbon product boiling in the range of 300° to 700° F.

40. A process as defined in claim 36 wherein said feedstock is a gas oil having at least 50 percent by weight of its components boiling above 700° F. and said contacting results in the production of a substantial proportion of a hydrocarbon product boiling in the range of 300° to 700° F.

41. A process as defined in claim 21, 22, 23, 28, or 29 wherein the support comprises between 10 and 70 percent of said zeolite.

42. A process as defined in claim 33 wherein the support comprises between 10 and 70 percent of said zeolite.

43. A process as defined in claim 42 wherein said Group VIII component comprises nickel and said Group VIB component comprises tungsten.

44. A process as defined in claim 2, 7, 8, 9, 11, 12, 13, 14, 18, 28 or 29 wherein said alumina comprises gamma alumina.

* * * * *

UNITED STATES PATENT AND TRADEMARK OFFICE
CERTIFICATE OF CORRECTION

PATENT NO. : 4,517,074

DATED : May 14, 1985

INVENTOR(S) : John W. Ward

It is certified that error appears in the above-identified patent and that said Letters Patent are hereby corrected as shown below:

Column 17, line 8, "31" should read -- 30 --.

Signed and Sealed this

Twenty-fifth Day of February 1986

[SEAL]

Attest:

Attesting Officer

DONALD J. QUIGG

Commissioner of Patents and Trademarks